Figure 1:
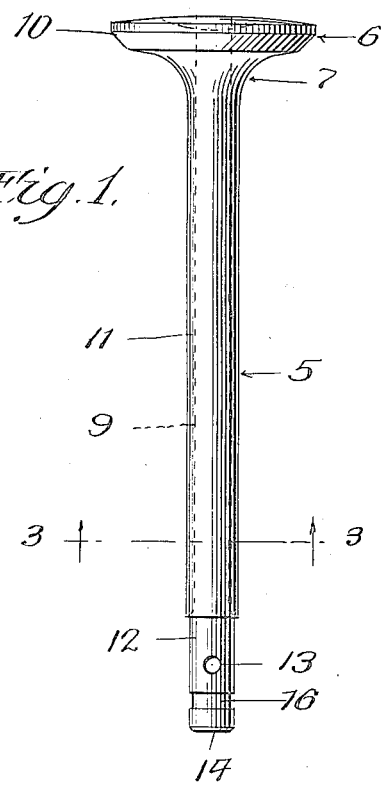

Feb. 6, 1923.

G. R. RICH.
POPPET VALVE FOR INTERNAL COMBUSTION ENGINES.
FILED SEPT. 20, 1922.

1,444,210.

Inventor:
George R. Rich,
by Charles O. Sheroy
his Atty.

Patented Feb. 6, 1923.

1,444,210

UNITED STATES PATENT OFFICE.

GEORGE R. RICH, OF LOS ANGELES, CALIFORNIA.

POPPET VALVE FOR INTERNAL-COMBUSTION ENGINES.

Application filed September 20, 1922. Serial No. 589,304.

*To all whom it may concern:*

Be it known that I, GEORGE R. RICH, a citizen of the United States, and a resident of Los Angeles, Los Angeles County, and State of California, have invented certain new and useful Improvements in Poppet Valves for Internal-Combustion Engines, of which the following is declared to be a full, clear, and exact description.

This invention relates to poppet valves for internal combustion engines, and more particularly to that type of poppet valves formed of composite materials. It is well known that the hot gases of internal combustion engines cause rapid deterioration of valves formed of steel, or of alloys containing nickel as a base. This is especially true of the exhaust valves, the hot gases eating or wearing away the stem directly under the valve head, thus weakening the valve and soon permitting the stem to warp, and allowing the head to seat imperfectly, making it necessary to regrind the valve or to discard the valve and replace it with a new one.

The use of cast iron valve heads cast upon steel stems for overcoming this difficulty has been tried, but cast iron does not fuse to steel and an imperfect union results. In such cases, the steel or wrought metal stems, at least the portions thereof immediately below the valve heads, are subject to the same destructive effects. A composite valve made of a wrought metal stem and a body of cast metal containing nickel, cast onto the stem, has been suggested, but here also the metal is rapidly eaten or worn away.

The principal objects of the present invention are to provide an extremely cheap but highly efficient valve, and one that is not subject to the destructive effects of the hot gases of motors. Another object is to provide a valve containing a steel core (which may be hardened at the end which is engaged by the tapped or push rod) and a semi-steel head and sheath for the major portion of the core, cast upon said core and positively fused thereto, whereby all danger of separation between the stem and head is wholly eliminated.

The invention consists in a composite poppet valve, containing a more or less frangible valve head and sheath like stem portion formed of cast metal, such as semi-steel, and a central core of tougher material for strengthening the more frangible external element, the one fusible with the other and both being fused together throughout their extent, and the external element having inherent qualities, capable of effectively resisting the corrosive effects of, and protecting the internal strengthening element against the hot gases of internal combustion engines, particularly the ones resulting from the commercial combustible fluids now commonly used in the motors of automobiles, trucks, tractors, and other motor driven vehicles. The invention further consists in the several novel features hereinafter fully set forth and claimed.

Figure 2:
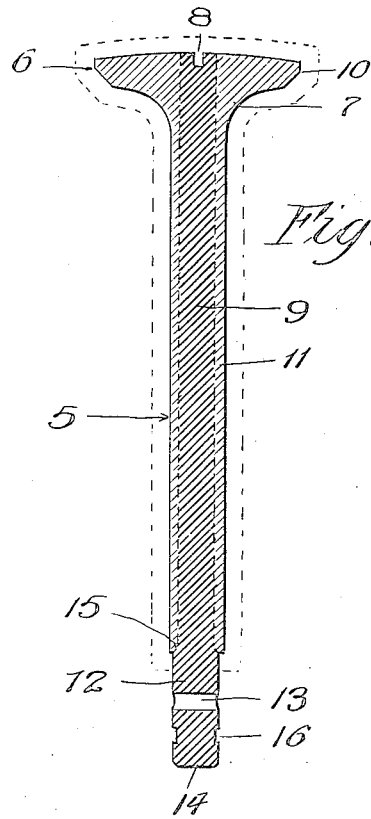
Figure 3:
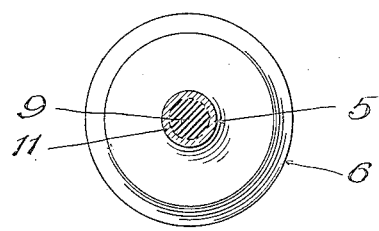

The invention is clearly illustrated in the accompanying drawing, in which:

Fig. 1 is a side elevation of a poppet valve embodying a simple form of the present invention; Fig. 2 is a central longitudinal section therethrough, and Fig. 3 is a cross section taken on line 3—3 of Fig. 1.

Referring to said drawing, the reference character 5, designates the valve stem and 6, the valve head of a poppet valve containing one embodiment of the present invention. The head is of the usual disk-like formation, commonly employed in poppet valves for internal combustion engines, and joins the stem by a fillet 7 as usual. A groove 8 is provided in the end face of the head to accommodate a screw driver or other tool used in grinding valves. The shape and size may be varied to accommodate nearly all, if not all, motors that use the poppet type of valve.

The valve is composed of a central core 9, preferably formed of a soft steel rod, and a cast metal head 10, and sheath like stem portion 11, cast upon the major portion of the core 9, and fused thereto, so as to be integral therewith. The metal from which the valve head and sheath is made is semi-steel, namely; cast iron containing a sufficient percentage of steel in its composition to enable it to be fused to the steel core; about fourteen to eighteen per cent of steel being sufficient for this purpose. The cast metal stem portion 11 forms a sheath or protecting cover for the soft steel core 9 and protects the vulnerable part of the core directly below the head (which would otherwise be under the direct destructive influence of the hot gases) and said cast metal sheath also forms an efficient bearing surface which engages with the bearing surface of the valve guide (not shown) in which the stem is mounted. The end portion 12 of the core, protrudes from the cast metal sheath 11, and is provided with means for retaining the valve spring, as for instance, it may be drilled as at 13 for the reception of a spring retaining cotter pin, or it may be formed with an annular groove 16 for the spring retaining washer, or it may be formed with both if desired. The extreme end 14 may be hardened to provide a hard end bearing face for the tappet or push rod to strike against. If desired, the lower portion of the core may be swelled slightly to leave a shoulder 15 where the core enters the sheath.

In order that the cast metal part may be positively fused to the steel core, and may not be merely "burnt" thereon, the metal is made to contain approximately from fourteen to eighteen per cent of steel. With that proportion of steel content, in the iron, the steel therein will positively unite with the steel core and consequently fuse the cast metal to the core. A good grade of pig iron is used and care is taken to properly proportion the iron and steel contents of the metal before smelting. Furthermore, in smelting the metals the pig iron and the steel (preferably steel bars broken or cut up into small pieces) are heated to the desired temperature for smelting and the mass is poured before the steel contents have been entirely assimilated by the iron mass, because it is necessary in order to obtain the best results, to retain at least a considerable portion of the steel contents in an unassimilated state in the mass. The proper temperature for pouring is of course dependent on various conditions such as the size of the pieces of steel, and the composition of the metals, but the proper instant is readily determined by a skilled workman after a little practice.

It is to be understood that in the process of casting and fusing the body portion to the core, it is not intended to use a mixture of steel and iron that results in a poor grade of steel and that the term semi-steel is not to be interpreted as referring to such a composition, but rather to an iron mass containing perceptible traces of unassimilated steel which fuses to the steel core. When cast iron is "burnt" on to a steel core, the molten metal forms small pockets in the steel core, into which the cast iron enters, but the two metals do not fuse together consequently there is not an efficient connection between the cast iron and steel which results in imperfect and impracticable valves. With the addition of the small percentage of steel, the steel core and cast iron external body are united and form an integral body in which the possibility of separation between the cast portion and steel core is wholly eliminated.

In making the casting, it is the practice to allow about one-eighth of an inch cast metal all around for finish, as is shown by the dotted lines in Fig. 2. This assures a run of metal sufficient to fuse to the soft steel core. The excess metal is machined off as is well understood in giving the valve its proper shape and size.

The advantages of a valve constructed as above described consist in the fact that the hot gases of the motor have no injurious effect on the cast metal outer portions, and therefore permits the valve to be operated for an indefinite length of time without injury, whereas with steel valves, nickel steel valves, tungsten steel valves, especially in trucks and tractors, the portions of the stem directly under the head soon becomes worn or eaten away, and often the face of the valve, which contacts with the seat, soon becomes eaten away, whereas with the use of the semi-steel body, the effect of the gases thereon is negligible. By extending the cast metal down along the core, to a point adjacent the end thereof, the steel core is protected, against the destructive effects of the hot gases, a cast metal bearing surface is provided, and an end potion of the core is left for hardening purposes. The soft steel core stiffens the cast metal portion and eliminates the possibility of the valve breaking off or coming apart, and because of the inherent properties of the cast iron, the sheath effectively protects the vulnerable part of its strengthening core against the destructive influences of the hot gases. By extending the core down beyond the cast portion, the spring retaining pin hole and groove may be formed without weakening the cast portion.

This valve has been designed for use in the motors of automobiles, trucks, tractors and other motor driven vehicles, but may obviously be used in stationary engines. While it is highly efficient for use in original installations, it will be found especially useful in replacing worn out or defective steel valves and serves the purpose as well, if not better, than the more expensive valves constructed of steel and alloys containing nickel.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new, and desire to secure by Letters Patent:

1. A poppet valve for internal combustion engines comprising a steel core and a cast metal valve head containing initially from 14 to 18 per cent of unassimilated steel fusible with the steel core, said core and head being fused together in the final product.

2. A poppet valve for internal combustion engines comprising a steel core, and a cast metal valve head and core portecting sheath containing from 14 to 18 per cent of unassimilated steel fusible with the steel core, said core, head and sheath being fused together in the final product.

GEORGE R. RICH.